Figure 1:
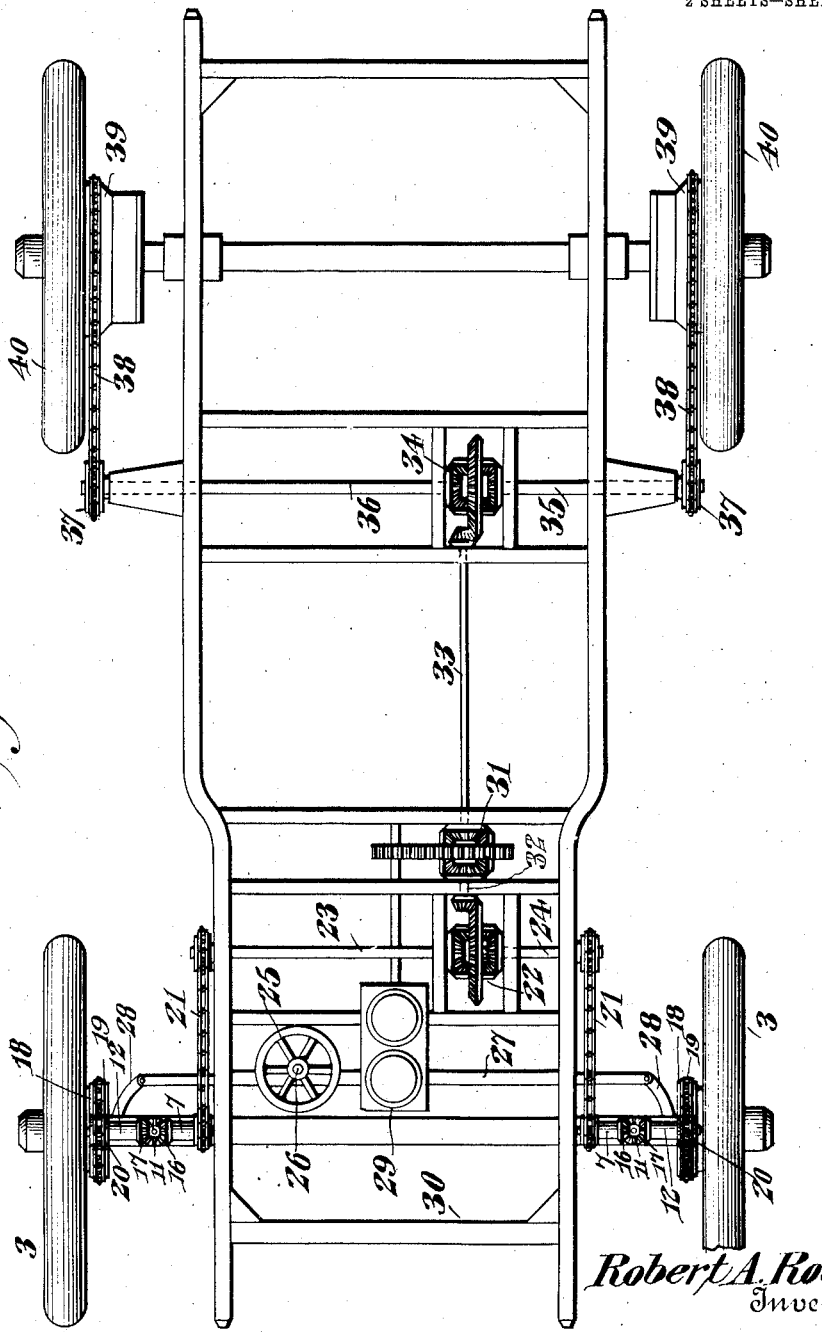

R. A. ROSE.
GEARING FOR MOTOR VEHICLES.
APPLICATION FILED MAR. 31, 1908.

906,936.

Patented Dec. 15, 1908.

2 SHEETS—SHEET 1.

Witnesses

Robert A. Rose,
Inventor

By

Attorney

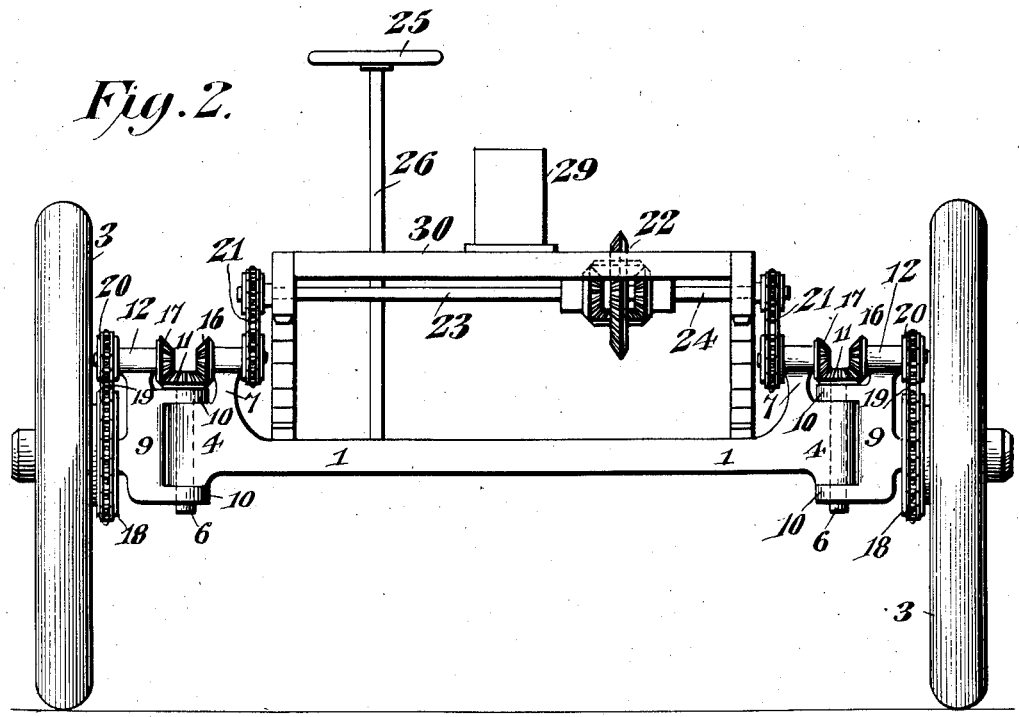
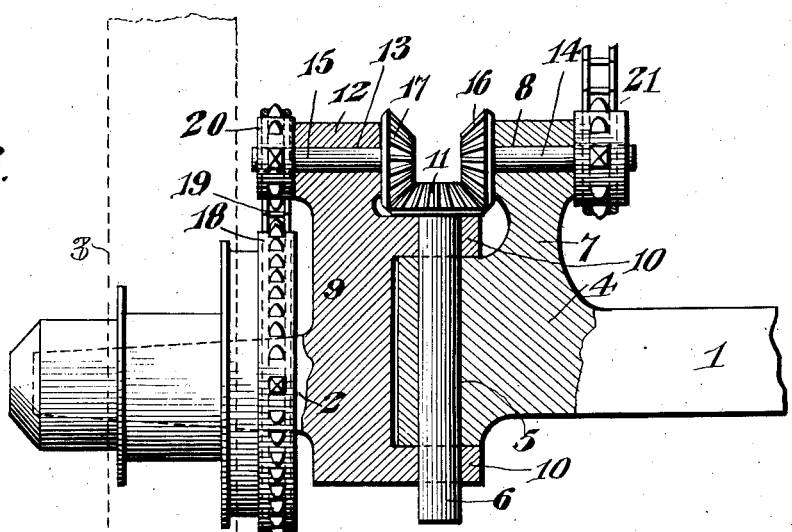

UNITED STATES PATENT OFFICE.

ROBERT ALLEN ROSE, OF SANTA ROSA, CALIFORNIA, ASSIGNOR OF ONE-HALF TO GEORGE C. HOLBROOK, OF SANTA ROSA, CALIFORNIA.

GEARING FOR MOTOR-VEHICLES.

No. 906,936.

Specification of Letters Patent.

Patented Dec. 15, 1908.

Application filed March 31, 1908. Serial No. 424,341.

*To all whom it may concern:*

Be it known that I, ROBERT A. ROSE, a citizen of the United States, residing at Santa Rosa, in the county of Sonoma and State of California, have invented a new and useful Gearing for Motor-Vehicles, of which the following is a specification.

The invention relates to improvements in gearing for transmitting power to the front wheels of a motor vehicle.

The object of the present invention is to improve the construction of gearing for transmitting power to and driving the front wheels of an automobile, or other motor vehicle, and to provide simple, inexpensive and efficient gearing of this character of great strength and durability capable of driving the front wheels without interfering with the steering of the motor vehicle.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of the running gear of a motor vehicle provided with gearing, constructed in accordance with this invention. Fig. 2 is a front elevation of the same. Fig. 3 is an enlarged detail sectional view, illustrating the construction of the front axle and the arrangement of the gearing.

Like numerals of reference designate corresponding parts in all the figures of the drawings.

The front axle is composed of an intermediate section or body portion 1 and end sections or spindles 2, pivotally connected with the ends of the body portion and having wheels 3 mounted on them in any preferred manner. The ends 4 of the intermediate section or body of the axle are enlarged and provided with vertical openings 5 for the reception of a vertical pivot 6. The enlarged end 4 is also provided at the top with an upwardly extending arm 7, located at the inner side of the opening 5 and having a horizontal bearing opening 8. The end section or spindle 2 has an enlarged inner portion forming a yoke 9, having spaced upper and lower sides or lugs 10 receiving the enlarged end 4 of the body portion of the axle between them and pivoted to the same by the vertical pivot 6. The lugs are provided with openings, which register with the opening 5 of the end 4 of the body of the axle, and the vertical pivot 6 is provided at its upper end with a horizontal bevel gear 11, forming a head for the pivot and resting upon the upper lug or side of the yoke, as clearly illustrated in Fig. 3 of the drawings. The spindle or end section of the axle is also provided with an upwardly extending bearing arm 12, arranged at the top of the yoke and having a horizontal bearing opening 13. The upwardly extending bearing arms 7 and 12 have their bearing openings located opposite each other, when the spindle is in alinement with the body of the axle and they receive inner and outer short horizontal shafts 14 and 15. The inner horizontal shaft 14 is equipped at its outer end with a vertical bevel gear 16, which meshes with the horizontal bevel gear 11, and the outer horizontal shaft 15 is provided at its inner end with a vertical bevel gear 17, which also meshes with the horizontal bevel gear 11. The horizontal bevel gear 11 constitutes an idler for communicating motion from the inner vertical bevel gear 16 to the outer vertical bevel gear 17.

The vehicle wheel 3 is provided with a sprocket wheel 18, suitably connected with the hub of the wheel 3 and receiving a sprocket chain 19, which is also arranged on a sprocket pinion 20, secured to the outer end of the short horizontal shaft 15. The inner end of the inner horizontal shaft 14 is connected by sprocket gearing 21 with the driving mechanism of the motor vehicle. The driving mechanism, which may be of any preferred construction, is preferably equipped with compensating gearing 22, connected with transverse shafts 23 and 24, which are connected by the said sprocket gearing with the inner horizontal shafts 14.

The compensating gearing is driven from a suitable motor 29, mounted on the frame 30 of the running gear and having its driving shaft connected by compensating gearing 31 with opposite longitudinal shafts 32 and 33. The longitudinal shaft 33 is connected with the front compensating gearing 22, and the rear longitudinal shaft 33 is connected by rear compensating gearing 34 with opposite transverse shafts 35 and 36 carrying sprocket pinions 37 at their outer ends and connected by sprocket chains 38 with sprocket wheels 39 of the rear wheels 40 of the running gear for driving the same.

The motor vehicle is designed to be equipped with the usual steering wheel 25, secured to the upper end of a shaft or post 26, which is operatively connected in the usual manner with a transverse rod 27, extending across the front portion of the vehicle in rear of the front axle and pivoted at its ends to arms 28, extending rearwardly from and connected with the end sections or spindles of the axle.

The front wheel in making a turn is caused to travel around an arc of a circle having for its radius the distance between the pivotal axis of the knuckle joint and the center of the tread of the wheel, and the miter gear 17 travels around the idler 11 directly in proportion to the annular motion. For instance, if we assume that the diameter of the front driving wheel is thirty six inches and the distance from the center of tread to the center of the pivot 5 is six inches, the front wheel in making a complete revolution around the pivot, would make but one third of a rotation on the spindle, but the miter gear 17 being in mesh with the idler 11, which is of the same diameter as the miter gear 17, would make a complete rotation on its own axis while making one revolution around the idler 11. If the miter gear 17 and the front wheel were rigidly connected, it would be impossible to turn the front wheel to change the direction of the vehicle without sliding the front wheel over the ground. In order to overcome this, the sprocket gearing is employed, and the sprocket wheels are so proportioned as to cause the miter gear to make its proper axial revolution. In the proportions aforesaid it would be necessary to make them relatively three to one, and this would cause the miter gear 17 to travel around the idler 11 without any twisting strain on the shaft. The sprocket gearing, which connects the outer horizontal shaft with the front wheel is more or less yieldable, and any springing of the axle will not affect the proper meshing of the gears.

Having thus fully described my invention, what I claim as new and desire to secure by Letters Patent, is:—

1. In gearing of the class described, the combination of a front axle having a body portion and provided with a pivoted spindle, inner and outer horizontal shafts mounted on the body of the axle and the pivoted spindle and provided at their proximate ends with gears, an idler gear meshing with the said gears, a front wheel mounted on the spindle, and sprocket gearing for communicating motion from the outer horizontal shaft to the front wheel.

2. In gearing of the class described, the combination of an axle having a body portion and provided with a pivoted spindle, inner and outer horizontal shafts located at the top of the axle and mounted on the body portion thereof and on the spindle and provided at their proximate ends with gears, an idler gear mounted on the pivot of the spindle and meshing with the said gears, and sprocket gearing connected with the outer horizontal shaft for communicating motion therefrom to the front wheel.

3. In gearing of the class described, the combination of an axle body provided with an upwardly extending arm having a horizontal bearing, a spindle pivoted to the body and provided with an upwardly extending arm having a horizontal bearing, inner and outer horizontal shafts journaled in the said bearings and provided at their proximate ends with vertical gears, an idler gear meshing with the said gears and seated on the spindle, and gearing for communicating motion from the outer horizontal shaft to the front wheel.

4. In gearing of the class described, the combination of an axle body having an upwardly extending bearing arm, a spindle provided with a yoke to receive the axle body and having an upwardly extending bearing arm, a pivot piercing the yoke and the axle body and pivoting the spindle to the said body, inner and outer horizontal shafts mounted on the said bearing arms and provided at their proximate ends with gears, an idler gear mounted on the said pivot and meshing with the said gears, and gearing for communicating motion from the outer horizontal shaft to the front wheel.

5. In gearing of the class described, the combination of an axle body having an enlarged end and provided with a bearing arm projecting upwardly from the said end, a spindle also provided with an upwardly extending bearing arm and having a yoke receiving the enlarged end of the axle body, a vertical pivot piercing the yoke and the axle body, inner and outer horizontal shafts journaled in the bearing arms and provided at their proximate ends with vertical gears, a horizontal gear mounted on the pivot and meshing with the vertical gears, and sprocket gearing for communicating motion from the outer horizontal shaft to the front wheel.

6. In gearing of the class described, the combination with a running gear including a frame, of a front axle composed of a body portion, and spindles pivoted to the body portion, inner and outer short horizontal shafts mounted on the body and on the spindles and arranged in pairs, each pair being provided at their proximate ends with gears, idler gears meshing with the said gears, gearing for connecting the outer horizontal shafts with the front wheels of the running gear, a motor, opposite transverse shafts connected together and driven by the said motor, and sprocket gearing located at opposite sides of the running gear and connected with the short inner shafts.

7. In gearing of the class described, the combination of a front axle having a body portion and provided with a pivoted spindle, short inner and outer horizontal shafts mounted, respectively, on the body portion of the axle and on the pivoted spindle and provided at their proximate ends with gears, an idler gear meshing with the said gears, a front wheel mounted on the spindle, means for communicating motion from the outer horizontal shaft to the front wheel, and gearing connected with the inner horizontal shaft for driving the same.

In testimony, that I claim the foregoing as my own, I have hereto affixed my signature in the presence of two witnesses.

ROBERT ALLEN ROSE.

Witnesses:
GEORGE C. HOLBROOK,
R. E. FOSTER.